United States Patent
Chen

(10) Patent No.: US 10,249,181 B2
(45) Date of Patent: Apr. 2, 2019

(54) WIRELESS RELAY DEVICE AND WIRELESS RELAY CONTROL SYSTEM HAVING THE SAME

(71) Applicant: Tse-Hsing Chen, Taipei (TW)

(72) Inventor: Tse-Hsing Chen, Taipei (TW)

(*) Notice: Subject to any disclaimer, the term of this patent is extended or adjusted under 35 U.S.C. 154(b) by 0 days.

(21) Appl. No.: 15/785,787

(22) Filed: Oct. 17, 2017

(65) Prior Publication Data
US 2018/0365978 A1 Dec. 20, 2018

(30) Foreign Application Priority Data
Jun. 20, 2017 (TW) .............................. 106208895 U

(51) Int. Cl.
*H04W 4/80* (2018.01)
*G08C 17/02* (2006.01)
*H04W 76/14* (2018.01)

(52) U.S. Cl.
CPC ......... *G08C 17/02* (2013.01); *G08C 2201/61* (2013.01); *H04W 4/80* (2018.02); *H04W 76/14* (2018.02)

(58) Field of Classification Search
CPC ............ G07C 9/00158; G07C 9/00087; G07C 9/00563; G07C 9/00071; G07C 9/00103; G07C 9/00571; G07C 9/00111
USPC ...................................................... 340/5.52
See application file for complete search history.

(56) References Cited

U.S. PATENT DOCUMENTS

| 2013/0145482 A1* | 6/2013 | Ricci | H04W 4/90 726/28 |
| 2015/0024688 A1* | 1/2015 | Hrabak | H04W 4/80 455/41.2 |
| 2015/0210287 A1* | 7/2015 | Penilla | B60W 40/08 701/49 |
| 2018/0059913 A1* | 3/2018 | Penilla | G07C 5/008 |
| 2018/0075434 A1* | 3/2018 | Supernault | G06F 21/32 |

\* cited by examiner

*Primary Examiner* — Mark S Blouin
(74) *Attorney, Agent, or Firm* — Behmke Innovation Group LLC; James Behmke; Stephen D. LeBarron

(57) ABSTRACT

A wireless relay device and a wireless relay control system are provided. The wireless relay control system includes a wireless relay device and a mobile device carrier. The wireless relay device includes a power switch for controlling power supply to a vehicle, a relay communication module for performing wireless communication, and a relay processing unit for controlling the power switch and the relay communication module. The mobile device carrier is electrically connected with the wireless relay device and equipped with an application program including a biometric identification module for controlling a biometric identification function and an application communication module for controlling a communication function. The application communication module performs handshake with the relay communication module, and the biometric identification module verifies a biometric feature of a user to control the power switch to or not to supply power to the vehicle.

8 Claims, 3 Drawing Sheets

WIRELESS RELAY DEVICE AND WIRELESS RELAY CONTROL SYSTEM HAVING THE SAME

RELATED APPLICATION

This application claims the benefit of Taiwanese Patent Application No. 106208895, filed on Jun. 20, 2017, the entire content of which is incorporated herein.

BACKGROUND

1. Technical Field

The present disclosure relates to relay control systems, and, more particularly, to a wireless relay control system for controlling a wireless relay device through biometric identification provided by a mobile device carrier.

2. Description of Related Art

Cars have become an indispensable means for transportation. In the development of car industry, in order to prevent car theft, various anti-theft mechanisms have been developed, from the earliest mechanical keys and matched key locks, to remotely controlled keys, and to chip keys that are commonly seen these days.

For more security against theft, some owners add a second layer of anti-theft mechanism on top of the key lock that is already equipped in the vehicles through the use of a steering wheel lock, for example. However, it takes a long time to unlock a mechanical steering wheel lock, and there is still the risk of the lock being forcibly cut off or damaged. With the evolution of science and technology, biometric technology has become more affordable and therefore pervasive. In order to ensure that only authorized people can disarm an anti-theft device, biometrics is also being used in the field of vehicle anti-theft technology. For example, fingerprint identification equipment can be installed on a door grip, so that the owner's fingerprint is verified while he or she is opening the door of the car in addition to using a chip key to unlock the car.

However, if such a biometric device is installed on the door handle of a car, the original structure of the door needs to be modified, which increases the difficulty in assembly, and cannot be done by a common user. Moreover, the fingerprint identification equipment is expensive, which increases the overall cost of the car. Furthermore, the fingerprint identification equipment consumes a considerable amount of power as it has to stay on for long periods of time. Therefore, there is still room for improvement in the practical application of biometrics in vehicles.

SUMMARY

The present disclosure provides a wireless relay control system, which may include: a wireless relay device including a power switch for controlling power supply to a vehicle, a relay communication module for performing wireless communication, and a relay processing unit for controlling the power switch and the relay communication module; and a mobile device carrier electrically connected with the wireless relay device and equipped with an application program, the application program including a biometric identification module for controlling a biometric identification function of the mobile device carrier and an application communication module for controlling a communication function of the mobile device carrier, wherein the application communication module of the mobile device carrier performs handshake with the relay communication module of the wireless relay device, and the biometric identification module verifies a biometric feature of a user to control the power switch to or not to supply power to the vehicle.

In an embodiment, the handshake between the application communication module and the relay communication module is performed according to Wi-Fi, Li-Fi, Bluetooth, Wireless USB, NFC, RFID, radio, TransferJet, DSRC, EnOcean, ZigBee or UWB communication protocol.

In an embodiment, the biometric identification module verifies the biometric feature of the user by verifying a fingerprint, an iris, voice, a face feature or a vein of the user.

In an embodiment, the wireless relay device replaces a start relay, a fuel pump relay or an ignition relay of the vehicle, or is adapted to control fuses or control circuits of an engine.

In an embodiment, when the application communication module of the mobile device carrier performs the handshake with the relay communication module of the wireless relay device, the relay processing unit generates and transmits a random code to the application program, and the application program processes the random code and appends a valid period of use to the random code to generate a sharing code that allows a different mobile device carrier to pair with the wireless relay device.

The present disclosure further provides a wireless relay device, which may include: a power switch for controlling power supply to a vehicle; a relay communication module for performing wireless communication; and a relay processing unit for controlling the power switch and the relay communication module, wherein the relay communication module performs handshake in a wireless manner with an application communication module equipped in a mobile device carrier, and a biometric identification module of the mobile device carrier verifies a biometric feature of a user and transmits a signal to the relay processing unit to control the power switch to or not to supply power to the vehicle.

In an embodiment, the handshake between the application communication module and the relay communication module is performed according to Wi-Fi, Li-Fi, Bluetooth, Wireless USB, NFC, RFID, radio, TransferJet, DSRC, EnOcean, ZigBee or UWB communication protocol.

In an embodiment, the biometric identification module verifies the biometric feature of the user by verifying a fingerprint, an iris, voice, a face feature or a vein of the user.

In an embodiment, the wireless relay device replaces a start relay, a fuel pump relay or an ignition relay of the vehicle, or is adapted to control fuses or control circuits of an engine.

In an embodiment, when the relay communication module of the wireless relay device performs the handshake with the application communication module, the relay processing unit generates and transmits a random code to the mobile device carrier, and the mobile device carrier appends a valid period of use to the random code to generate a sharing code that allows a different mobile device carrier to pair with the wireless relay device.

With the wireless relay control system and the wireless relay device according to the present disclosure, cost can be reduced by eliminating the need for an expensive biometric identification device having high-speed computing power and concealment can be achieved by making the appearance of the wireless relay device the same as that of an ordinary relay.

DETAILED DESCRIPTION OF THE EMBODIMENTS

Figure 1:
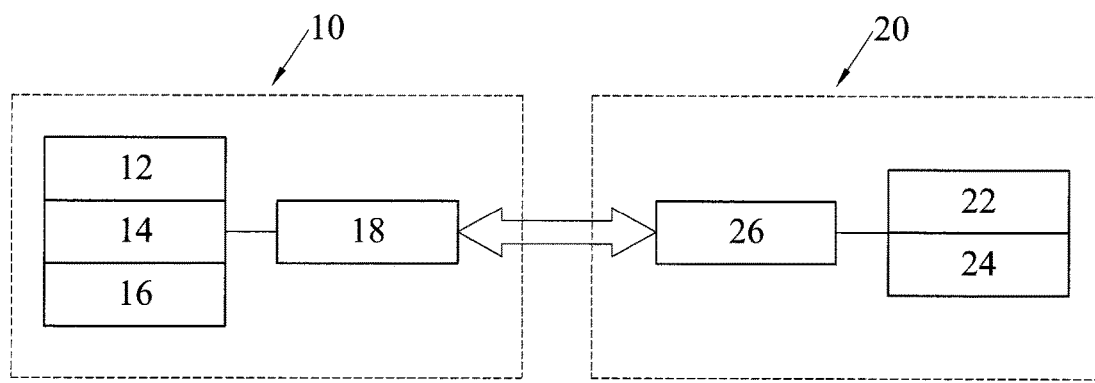
FIG. 1 is a schematic diagram depicting a wireless relay control system applicable to a vehicle in accordance with the present disclosure.

The present disclosure is described by the following specific embodiments. Those with ordinary skills in the arts can readily understand other advantages and functions of the present disclosure after reading the disclosure of this specification. The present disclosure may also be practiced or applied with other different implementations. Based on different contexts and applications, the various details in this specification can be modified and changed without departing from the spirit of the present disclosure.

It should be noted that the structures, ratios, sizes shown in the drawings appended to this specification are to be construed in conjunction with the disclosure of this specification in order to facilitate understanding of those skilled in the art. They are not meant, in any ways, to limit the implementations of the present disclosure, and therefore have no substantial technical meaning. Without affecting the effects created and objectives achieved by the present disclosure, any modifications, changes or adjustments to the structures, ratio relationships or sizes, are to be construed as fall within the range covered by the technical contents disclosed herein. Meanwhile, terms, such as "internal", "external", "inside", "outside" and the like, are for illustrative purposes only, and are not meant to limit the range implementable by the present disclosure in any ways. Any changes or adjustments made to their relative relationships, without modifying the substantial technical contents, are also to be construed as within the range implementable by the present disclosure.

Referring to FIG. 1, a wireless relay control system applicable to a vehicle in accordance with an embodiment of the present disclosure is shown. The wireless relay control system includes: a wireless relay device 10 and a mobile device carrier 20 that matches with and is electrically connected to the wireless relay device 10.

The form factor of the wireless relay device 10 is similar to a typical relay, and can directly replace a start relay, a fuel pump relay or an ignition relay originally equipped in the vehicle (especially a car), or is adapted to control fuses or control circuits of an engine. The wireless relay device 10 includes at least a relay processing unit 12, a memory unit 14, a power switch 16 and a relay communication module 18. The relay processing unit 12 is electrically connected with the memory unit 14, the power switch 16 and the relay communication module 18 in order to control the memory unit 14, the power switch 16 and the relay communication module 18. The memory unit 14 is used for recording an external device that matches with the wireless relay device 10. The power switch 16 is installed in the car relay circuits for controlling the power supply of the car. The default state of the power switch 16 is open. The relay communication module 18 is used for wireless communication with the external device. The relay communication module 18 performs wireless handshakes with the external device via a communication protocol, such as Wi-Fi, Li-Fi, Bluetooth, Wireless USB, NFC, RFID, radio, TransferJet, DSRC, EnOcean, ZigBee, UWB or the like. In an embodiment, Bluetooth is used for illustration purpose only, and the present disclosure is not so limited.

In an embodiment, the mobile device carrier 20 is a smartphone, which is equipped with an application program 22. The mobile device carrier 20 includes a biometric identification module 24 and an application communication module 26. The application program 22 controls the biometric identification module 24 and the application communication module 26 of the mobile device carrier 20 to enable wireless handshakes and subsequent data transmission with the relay communication module 18 of the wireless relay device 10 via a communication function of the application communication module 26. The biometric identification module 24 is capable of performing identity check by identifying fingerprint(s), iris(es), voice (voiceprint), face features or veins of a user. In an embodiment, fingerprints or irises are used for illustration purpose only, and the present disclosure is not so limited.

Figure 2:
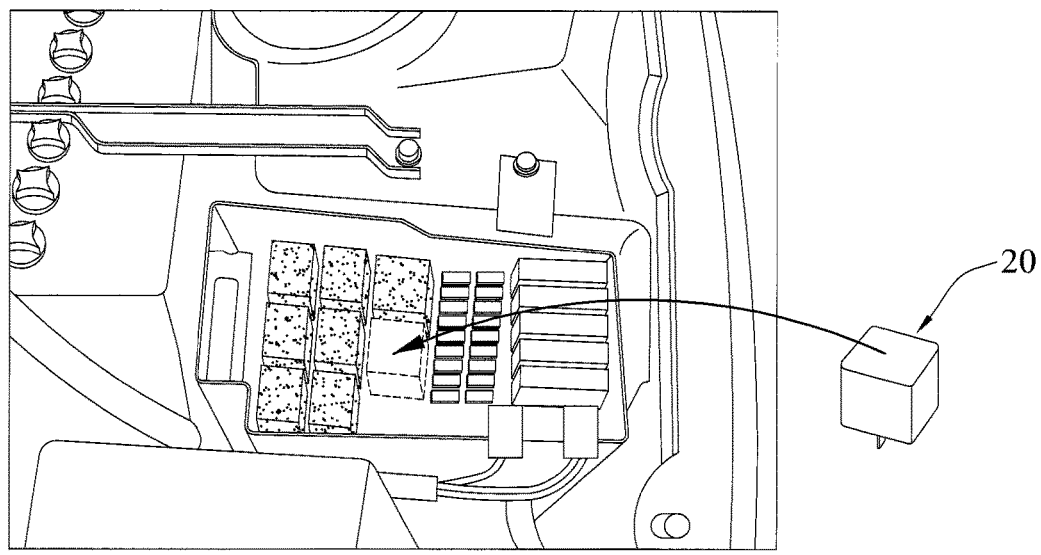
FIG. 2 is a schematic diagram illustrating installation of a wireless relay device in accordance with the present disclosure.

As shown in FIG. 2, a user can simply remove a relay that is originally equipped in the car and replace it with the wireless relay device 10 according to the present disclosure. The assembly of the wireless relay device 10 is similar to the existing relay, so there is no need for wire cutting and rewiring. This allows the car to maintain its original layout as well as having the advantage of easy assembly. Moreover, since the appearance of the wireless relay device 10 according to the present disclosure is not different from a typical relay, thieves will not be able to discern the difference just from the appearance of the wireless relay device. The default setting of the power switch 16 of the wireless relay device 10 is in open circuit, so even if a thief gained access into the car, he or she will not be able to start the car. As mentioned earlier, the wireless relay device 10 according to the present disclosure does not require extra wiring, so thieves will not be able to crack it just by looking at the wirings. It therefore has the advantage of being covert. Furthermore, the wireless relay device 10 according to the present disclosure is installed into the existing relay circuit, it does not consume a large amount of power as long as there is enough power to maintain Bluetooth signals of the relay communication module 18 of the wireless relay device 10.

Figure 3:
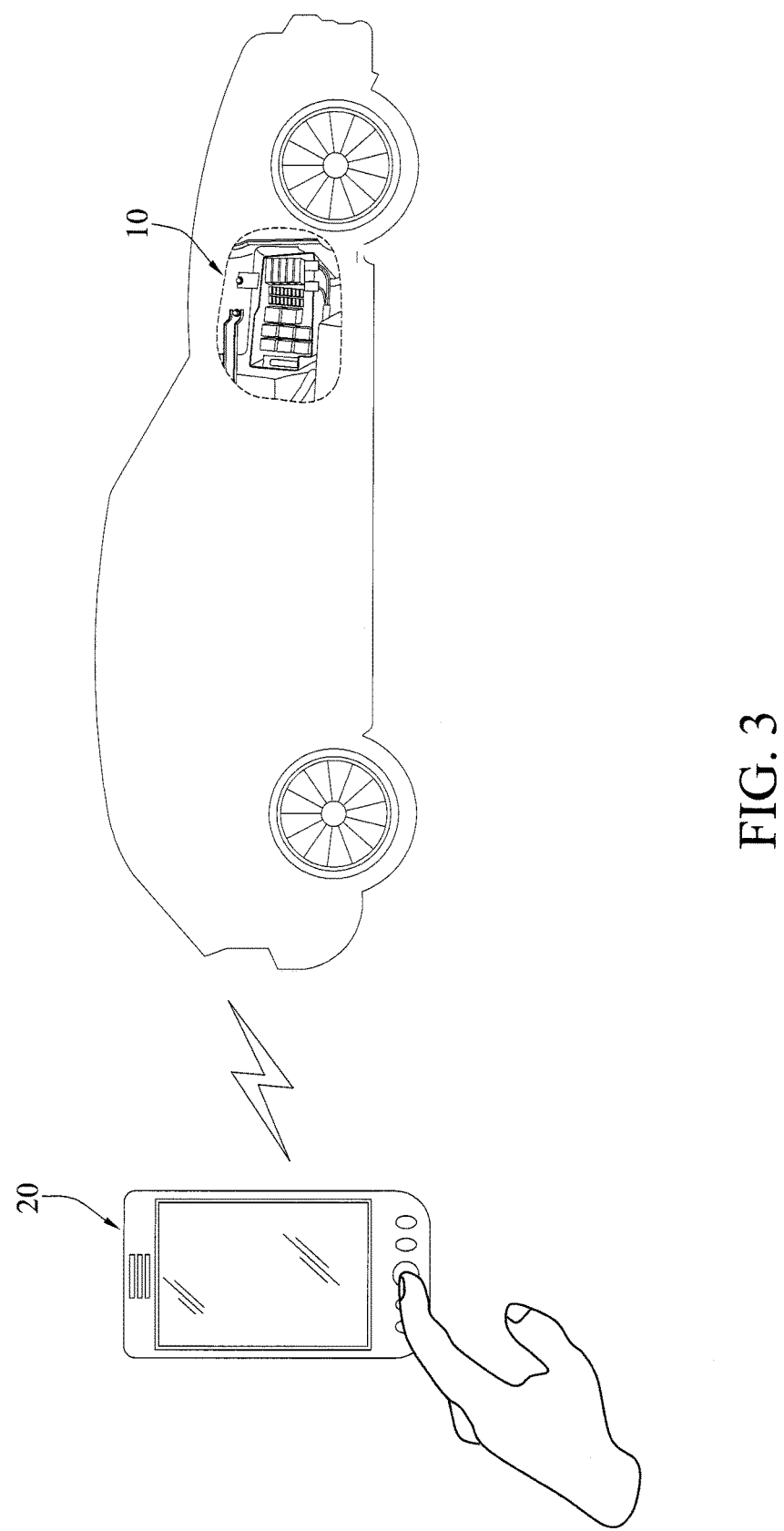
FIG. 3 is a schematic diagram illustrating a mobile device carrier performing fingerprint identification in accordance with the present disclosure.
Figure 4:
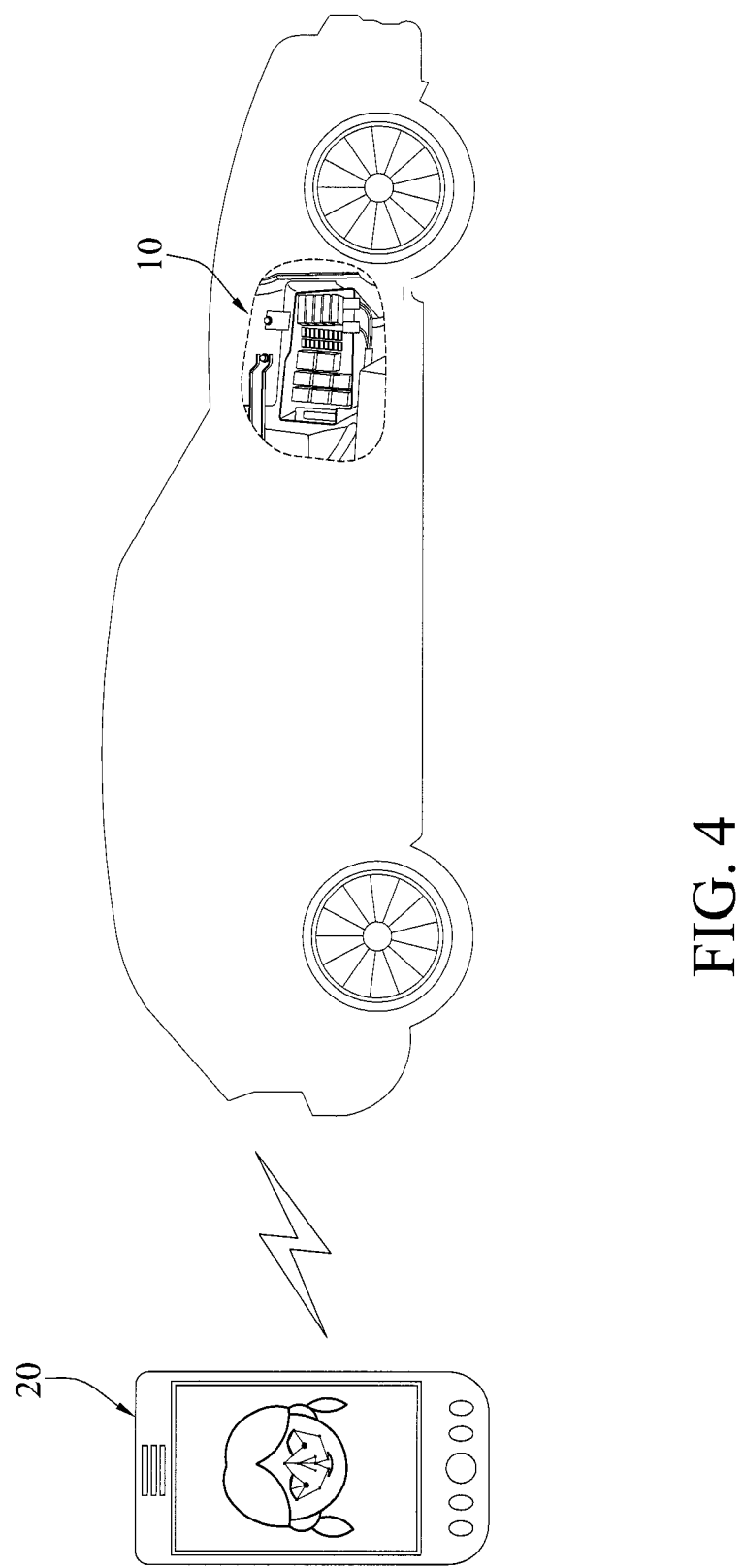
FIG. 4 is a schematic diagram illustrating the mobile device carrier performing face feature identification in accordance with the present disclosure.

As shown in FIGS. 3 and 4, as described before, the default setting of the power switch 16 of the wireless relay device 10 is in open circuit. When the user wishes to start the car (place the wireless relay device 10 in closed circuit), the application program 22 of the mobile device carrier 20 first controls the application communication module 26 to perform a wireless handshake (pairing up) with the relay communication module 18 of the wireless relay device 10, so that the mobile device carrier 20 stays connected with the wireless relay device 10. Then the user uses the application program 22 to activate the biometric identification module 24 in order to identify a fingerprint or an iris of the user through a biometric sensor or a camera of the mobile device carrier 20. When the fingerprint or the iris of the user is verified, the application program 22 of the mobile device carrier 20 transmits an anti-theft disarm signal to the relay communication module 18 of the wireless relay device 10 via the application communication module 26. The relay processing unit 12 then verifies the anti-theft disarm signal. If the signal is correct, the relay processing unit 12 then changes the state of the power switch 16 from open to closed circuit by controlling its internal motor or chip, thereby allowing power to be provided to the car.

In addition, the present disclosure can be applied in various different modes. Examples are as follow.

Car Sharing Mode: During the handshake between the application communication module 26 of the mobile device carrier 20 and the relay communication module 18 of the wireless relay device 10, the relay processing unit 12 of the wireless relay device 10 generates and transmits a random code to the application program 22. The application program 22 then appends a valid period of use to the random code and generates a car-sharing code. The user can transmit the car-sharing code to another user who then inputs the car-sharing code into a corresponding field in the application program 22 in order to perform handshake and establish a successful connection with the relay communication module 18 of the wireless relay device 10. In addition, biometric features of the another user are read and verified by the biometric identification module 24 before the application communication module 26 can transmit an anti-theft disarm signal to the relay communication module 18 of the wireless relay device 10 to "disarm" the power switch 16 and start the car during the valid period of use. If a new car-sharing code is required, the relay processing unit 12 can perform automatically code hopping to create a new random code, and the application program 22 having the same automatic code hopping function can also create a new car-sharing code based on the new random code and a new valid period of use. As such, the relay processing unit 12 is able to validate the new car-sharing code and allows multiple users to disarm the power switch.

Repair or Valet Parking Mode: The application program 22 may provide a repair or valent parking mode. When this mode is chosen, the wireless relay device 10 will set the power switch 16 in a continuous disarm (close-circuit) state, allowing the car to be started by anyone until this repair or valent parking mode is disabled.

Car Rental Mode: The car can be used by a car rental company. When used in a car rental mode, if a leaseholder did not pay the fees as agreed, the rental company is able to send a "service suspended" signal to the mobile device carrier 20 of the leaseholder via a server. If the leaseholder activates the biometric identification module 24 and wishes to send an anti-theft disarm signal via the application program 22 of the mobile device carrier 20, instead the suspended signal will be sent to the wireless relay device 10. As a result, the power switch of the wireless relay device 10 stays armed, thus preventing the leaseholder from using the car until unpaid fees is resolved. In addition, during the time in which the leaseholder is trying to send an anti-theft disarm signal via the mobile device carrier 20 by connecting with the relay communication module 18 of the wireless relay device 10, the application program 22 in the mobile device carrier 20 of the leaseholder can send the location of the car to the server so that the car rental company can obtain the current location of the car.

The above embodiments are only used to illustrate the principles of the present disclosure, and should not be construed as to limit the present disclosure in any way. The above embodiments can be modified by those with ordinary skill in the art without departing from the scope of the present disclosure as defined in the following appended claims.

What is claimed is:

1. A wireless relay control system, comprising:
   a wireless relay device including a power switch configured for controlling power supply to a vehicle, a relay communication module configured for performing wireless communication, and a relay processing unit configured for controlling the power switch and the relay communication module; and
   a mobile device carrier electrically connected with the wireless relay device and equipped with an application program, the application program including a biometric identification module configured for controlling a biometric identification function of the mobile device carrier and an application communication module configured for controlling a communication function of the mobile device carrier,
   wherein the application communication module of the mobile device carrier is configured to perform handshake with the relay communication module of the wireless relay device, and the biometric identification module is configured to verify a biometric feature of a user to control the power switch to or not to supply power to the vehicle, and
   wherein when the application communication module of the mobile device carrier performs the handshake with the relay communication module of the wireless relay device, the relay processing unit is configured to generate and transmit a random code to the application program, and the application program is configured to process the random code and append a valid period of use to the random code to generate a sharing code allowing a different mobile device carrier to remotely control the wireless relay device by using the sharing code within the valid period for a car sharing purpose.

2. The wireless relay control system of claim 1, wherein the handshake between the application communication module and the relay communication module is performed according to Wi-Fi, Li-Fi, Bluetooth, Wireless USB, NFC, RFID, radio, TransferJet, DSRC, EnOcean, ZigBee or UWB communication protocol.

3. The wireless relay control system of claim 1, wherein the biometric identification module is configured to verify the biometric feature of the user by verifying a fingerprint, an iris, voice, a face feature or a vein of the user.

4. The wireless relay control system of claim 1, wherein the wireless relay device is configured to replace a start relay, a fuel pump relay or an ignition relay of the vehicle, or is adapted to control fuses or control circuits of an engine.

5. A wireless relay device, comprising:
   a power switch configured for controlling power supply to a vehicle;
   a relay communication module configured for performing wireless communication; and
   a relay processing unit configured for controlling the power switch and the relay communication module,
   wherein the relay communication module is configured to perform handshake in a wireless manner with an application communication module equipped in a mobile device carrier having a biometric identification module configured to verify a biometric feature of a user and transmit a signal to the relay processing unit to control the power switch to or not to supply power to the vehicle, and
   wherein when the relay communication module performs the handshake with the application communication module, the relay processing unit is configured to generate and transmit a random code to the mobile device carrier configured to append a valid period of use for the random code to generate a sharing code allowing a different mobile device carrier to remotely control the wireless relay device by using the sharing code within the valid period for a car sharing purpose.

6. The wireless relay device of claim 5, wherein the handshake between the application communication module and the relay communication module is performed according to Wi-Fi, Li- Fi, Bluetooth, Wireless USB, NFC, RFID, radio, TransferJet, DSRC, EnOcean, ZigBee or UWB communication protocol.

7. The wireless relay device of claim 5, wherein the biometric identification module is configured to verify the biometric feature of the user by verifying a fingerprint, an iris, voice, a face feature or a vein of the user.

8. The wireless relay device of claim 5, which is configured to replace a start relay, a fuel pump relay or an ignition relay of the vehicle, or is adapted to control fuses or control circuits of an engine.

\* \* \* \* \*